(12) United States Patent
Thomsen

(10) Patent No.: US 7,194,004 B1
(45) Date of Patent: Mar. 20, 2007

(54) METHOD FOR MANAGING NETWORK ACCESS

(75) Inventor: Brant D. Thomsen, Sandy, UT (US)

(73) Assignee: 3Com Corporation, Marlborough, MA (US)

( * ) Notice: Subject to any disclaimer, the term of this patent is extended or adjusted under 35 U.S.C. 154(b) by 1161 days.

(21) Appl. No.: 10/060,112

(22) Filed: Jan. 28, 2002

(51) Int. Cl.
*H04L 12/28* (2006.01)
*G06F 21/00* (2006.01)

(52) U.S. Cl. .......................... 370/401; 726/11; 726/17; 726/21; 726/23; 726/26

(58) Field of Classification Search ................ 370/401, 370/352, 230, 254; 709/223, 220, 217, 203, 709/219
See application file for complete search history.

(56) References Cited

U.S. PATENT DOCUMENTS

| | | | | |
|---|---|---|---|---|
| 6,112,228 A | * | 8/2000 | Earl et al. | 709/205 |
| 6,226,743 B1 | * | 5/2001 | Naor et al. | 713/177 |
| 6,233,616 B1 | * | 5/2001 | Reid | 709/225 |
| 6,243,749 B1 | * | 6/2001 | Sitaraman et al. | 709/223 |
| 6,243,832 B1 | * | 6/2001 | Eckes et al. | 714/33 |
| 6,434,161 B1 | * | 8/2002 | Higbee et al. | 370/413 |
| 6,442,588 B1 | * | 8/2002 | Clark et al. | 709/203 |
| 6,745,333 B1 | * | 6/2004 | Thomsen | 726/23 |
| 2002/0066033 A1 | * | 5/2002 | Dobbins et al. | 713/201 |
| 2003/0182420 A1 | * | 9/2003 | Jones et al. | 709/224 |
| 2004/0003084 A1 | * | 1/2004 | Malik et al. | 709/225 |
| 2004/0203589 A1 | * | 10/2004 | Wang et al. | 455/410 |

* cited by examiner

*Primary Examiner*—Chi Pham
*Assistant Examiner*—Ronald Abelson

(57) ABSTRACT

A method for providing security in a computing network. A device connects to a network and authenticates itself with a server. Next, the server adds the IP address of the device to a list of trusted devices. The server broadcasts the trusted IP address to all devices in the network to which the newly authenticated device is allowed to communicate. The devices in the network add the trusted IP address to a list of trusted address stored on each device. The server may also transmit its stored list to the newly authenticated device. After a device has received a packet, it determines if the IP address associated with the packet is on its trusted list. If it is, the device processes the packet. If the IP address is not found on the safe list, the device queries the authentication server to determine if the IP address is safe.

20 Claims, 13 Drawing Sheets

METHOD FOR MANAGING NETWORK ACCESS

TECHNICAL FIELD

The present invention generally pertains to the field of networked computers. More particularly, the present invention is related to a method for providing security by restricting access to a network.

BACKGROUND ART

Modern computing networks allow great benefits by sharing information and computing resources. However, such networking presents several security issues. One such security issue is detecting that the security of a network has been potentially compromised by unauthorized access. Detection of such potential security compromise requires the detection of access to the computing network by entities lacking authorization to have such access.

Related to this issue of unauthorized access is a second security issue, which is preventing an unauthorized device, e.g., a computing and/or communications device wielded by an unauthorized entity, from actually getting into the network. Also, related to this second security issue is preventing such an unauthorized device that does penetrate the network from learning about the existence of network resources.

Further, related to the foregoing security issues is another: if an unauthorized device is detected, e.g., that its access to a network has not been prevented, the portion of the network to which it has access must at least be restricted. This can delimit the mischief the unauthorized device can cause.

Conventionally, two principal methods moderate access to a network. The first of these methods requires some type of identity authentication process for the entity attempting to access the network, effectively restricting network access to authorized persons. An example of this first method is the IEEE 802.1x Protocol, discussed in more detail below, wherein a satisfactory authentication interaction is required prior to any exposure of the network to the entity attempting to access it.

The second such method is the deployment of techniques to detect intrusion. An example of this second method is an Intrusion Detection System (IDS). An IDS employs software that detects unauthorized entrance to a network and/or to computer system components thereof. A network IDS (NIDS) supports multiple hosts. Typically, an IDS looks for signatures of known attempts to breach security as a signal of a possible security violation. An IDS may also look for deviations of normal routines as indications of a possible intrusion or other network security violation.

Referring to FIG. 1, most networks 120 have firewalls 135 to prevent unauthorized users to directly access the network 120 from outside the network 120 (e.g., from the Internet 140). The firewall 135 may implemented in software on a computer, in a router, in a stand-alone firewall box, etc. The network 120 may also have a Virtual Private Network (VPN) gateway 130. Virtual Private Networks enjoy the security of a private network via access control and encryption. In the system of FIG. 1, all traffic from the Internet 140 goes through either the firewall 135 or the VPN gateway 130. Thus, a certain measure of protection is provided for those paths.

However, the firewall 135 and VPN gateway 130 will not detect or prevent unauthorized access from within the network 120, which may be a wireline network 120a or a wireless network 120b. For example, with a typical Ethernet network, anyone that has physical access to a hardware port 128 on the network can attach electronic device 125 such as a laptop computer to gain access to the network 120, e.g., by using a Network Interface Card (NIC).

Unauthorized access can also be gained by attaching to a wireless Local Area Network (LAN) Point 127 attached to the network 120. Also, the firewall 135 may be avoided if a remote device connects to the network 120 using dial-up (RAS) 132 or even the Virtual Private Network gateway 130, thus achieving direct access the network 120. For example, an employee having a username and a password may use a dial-up connection to obtain access to a corporate network.

Furthermore, with a typical Ethernet network, any device 125 connected to the network 120 can communicate with any other device 125 on that segment 145 of the network 120. A router 137 or switch may be programmed block packets originating at a given device 125 from leaving the segment 145. However, this conventional method will not prevent the unauthorized device 125 from communicating with devices 125 on its own segment 145.

One conventional method for providing security for a network is described in the IEEE 802.1x specification. Therein is described a hardware block technique as illustrated in FIG. 2. When a client device 125 first connects to the network, the client device 125 is only allowed to communicate with the authentication server 121. A hardware switch 131 prevents the client device 125 from accessing the full network 141. After the client device 125 authenticates with the authentication server 121, the hardware switch 131 allows the client device 125 to have access to the network 141.

Another conventional method for promoting network security also involves a degree of server control. In this scheme, a network is constituted by a centralized server and peripheral entities, interconnected via their individual NICs. A peripheral entity intercommunicates with the centralized server via its NIC. The centralized server promulgates intercommunication policies to the NIC, instructing its entity as to whether intercommunication between that entity and certain Internet Protocol (IP) addresses is permissible or forbidden.

The intercommunication policies promulgated by the centralized server may also instruct an entity to permit or to prohibit certain intercommunication related events. Examples of such events include allowing its NIC to go into a promiscuous mode, and allowing the generation of fake responses or other signals to polling and other network queries, in order to keep a session active and prevent termination, such as by timeouts.

The foregoing conventional methods of moderating network access are problematic for at least two major reasons. In the first place, requiring authentication procedure compliance to gain network access is not fool proof. "Spoofing," e.g., faking the sending address of a data transmission in order to "authenticate without authorization," if successful, may expose even a seemingly secure network to intrusion. Spoofing will be discussed in somewhat greater detail below.

Further, the "seemingly secure" nature of the network in such an instance weaves an obviously false sense of security. This false sense of security has its own risks, because great amounts of mischief may occur under its camouflage. Such mischief may perhaps occur in a manner and on an order unlikely in a patently unsecure system, wherein network participants would more probably know to take appropriate precautions.

Secondly, conventional methods of detecting intrusion into secured networks typically seek effects there caused by the presence of and/or actions there taken by unauthorized entities who have gained access thereto. In many cases, this amounts to nothing more than internal damage assessment. It thus provides no ability to prevent the intrusion or resultant damage, or even to detect such intrusion in real time or near real time.

Another difficulty with conventional network security lies in how to detect unauthorized entry into certain network areas by an entity authorized to access other areas, and to prevent such unauthorized access. Once an entity has access to a portion of a network to which it is authorized for such access, problems may occur when that entity spoofs to gain access to other network areas normally off limits, e.g., restricted to it. However, it has proven difficult to establish conventional networking regimes that effectuate segregation of a network into areas differentially accessible to various entities.

On an exemplary corporate LAN for instance, an entity authorized for access to engineering may lack authority to access accounting, legal, personnel, marketing, and executive areas. Another entity thereon may be authorized access to accounting and personnel, but engineering, legal, and various other areas may be restricted to it. An entity wielded by a senior executive may, of course, require access to most, if not all, of the areas on the exemplary LAN.

Spoofing

Spoofing for intrusive access to a network and/or other circumvention or defeat of network security protocols may proceed by any of a number of different schemes. These schemes may be executed singly or in combination. Examples of more problematic spoofing schemes include the following.

False IP Addresses

As discussed above, an entity intruding upon a network may initiate spoofing. Spoofing may be effectuated in a number of ways. Exemplary methods by which spoofing has successfully led to intrusive network security violations include transmitting data packets purporting to originate from another entity, e.g., an entity authorized for access to the network being intruded upon. Spoofing by this method, an intrusive entity transmits identification information among the spoofing data packets which falsely claim the identity of (e.g., identifies the intrusive spoofing entity to the network by) the Internet Protocol (IP) address of the NIC of an authorized entity.

Duplicating MAC Addresses

Similarly, an intrusive entity may engage in spoofing by transmitting data packets duplicating the media access control (MAC) address of an authorized entity. A MAC address is a singular serial number preset hard coded, e.g., burned into NICs, such as Ethernet and Token Ring adapters and serving to uniquely identify that NIC from all others. The MAC address identifier is a participant in MAC layer functionality network adapters, including IEEE 802.1x and other IEEE 802 protocols, controlling access to the physical transmission media of a network.

This form of spoofing may be carried out in an attempt to gain access to network addresses that check MAC addresses. Such spoofing may also be conducted in an attempt to intercept network traffic intended only for the NIC that legitimately holds that MAC address.

Importantly, although each NIC does have a unique MAC Address burned into it, this preset MAC Address is effectively that NIC's default MAC Address. It is possible for the driver software controlling that NIC to override this burned in MAC Address by instructing the NIC to adopt a different MAC Address for use, similar or even identical in configuration to the burned-in MAC Address, but differing in some identifyingly unique specific. This possibility is what actually effectuates spoofing in this particular manner. Further, some NICs may allow the burned in MAC Address to actually be changed, such as by having new information burned into them, thus overwriting the original burned in MAC Address. This also effectuates this mode of spoofing.

Changing MAC Addresses

In the case of an entity whose MAC address rightfully gains it access to a certain portion of a network, spoofing may be attempted to intrude upon restricted areas of the network. Spoofing in such cases has been conducted by the entity admitted to the unrestricted area, then transmitting data packets purporting to have the MAC address of another entity, e.g., one permitted access to the restricted area.

Static Adoption of IP Addresses

Typically, entities seeking access to a network initiate a communicative interaction with a dynamic host configuration protocol (DHCP) server, wherein among other actions, the entity seeking access requests assignment of a network-specific IP address by that server. However, an intrusive entity may engage in spoofing by attempting to circumvent this assignment. Spoofing by this method, the intrusive entity adopts a static, e.g., unchanging, effectively permanent IP address, instead of requesting one from the network's DHCP server.

Inappropriate Non-Local IP Addresses

Networks are often segregated into localized sub-networks (e.g., subnets). Typically, IP addresses of entities within a particular subnet conform to some local configuration standard, identifying them as local IP addresses and assigning them an access level. These addresses would be assigned by a switch or a router respectively switching or routing data packets from those entities onto that particular subnet. However, an intrusive entity may engage in spoofing by attempting to circumvent this convention. Such spoofing includes the transmission of data packets having IP addresses inappropriate to that subnet, e.g., foreign to the configuration standard IP address identifier typically assigned by the routers and/or switches serving that subnet.

Inappropriate Routing/Switching Pathways

Segregated into local subnets, local network data traffic follows corresponding routing and switching pathways, which are also appropriate to the configuration of the local subnets. However, an intrusive entity may engage in spoofing by attempting to obscure, misrepresent, and/or otherwise obfuscate the path its data packets take. Such spoofing includes the transmission of data packets having IP addresses inappropriate to the pathway data packets would normally take on a particular subnet and possibly foreign to the configuration of that subnet.

The foregoing examples are not meant to be an exhaustive list of spoofing schemes used to intrude into secured networks or otherwise breach network security measures. They represent some of the more problematic of such spoofing schemes. However, in as much as such intrusions and other security breaches enabled by such spoofing continue to be problematic to networking and costly to users of networks, countermeasures to such schemes are sought. Such countermeasures should be capable of implementation without gross revamping of network architecture or burdening network accessibility by legitimate authorized entities.

Thus, a need has arisen for a way to prevent unauthorized access to a network. A still further need exists for a method that does not require changes to firmware of a switch to accomplish the security. A still further need exists for a method that works in a network which is vulnerable to attack from a direct connection. An even further need exists for a method that provides security when devices such as firewalls and VPN gateways are sidestepped.

SUMMARY

Embodiments of the present invention provide a way to prevent and restrict unauthorized access to a network. Embodiments provide a method that does not require changes to firmware of a switch to accomplish the security. Embodiments provide a method that works in a network which is vulnerable to attack from a direct connection. Embodiments provide a method that provides security when devices such as firewalls and VPN gateways are sidestepped.

A method for providing security in a computing network is disclosed. In one embodiment, first a device connects to a network and authenticates itself with a server. Next, the server adds the IP address of the device to a list of trusted devices. Then, the server broadcasts the trusted IP address to all devices in the network to which the newly authenticated device is allowed to communicate. Then, the devices in the network add the trusted IP address to a list of trusted address stored on each device.

In another embodiment, after the server adds the IP address of a newly authenticated device to its list of trusted IP addresses, it transmits that list to the newly authenticated device. The new device then adds these IP addresses to its original list, which may include, for example, addresses of safe servers. In additional embodiments, the device may be required to re-authenticate itself periodically and the server may send updated lists to the devices when a device has been removed from the trusted list on the server.

In another embodiment, after a device has received a packet, it determines if the IP address associated with the packet is a trusted address, which it does by checking the trusted list stored on the device. If it is trusted, the device processes the packet. If the IP address is not found on the safe list, the device queries the authentication server to determine if the IP address is safe. If it is not on the server's list the packet is rejected and a warning message may be generated by the server. If it is safe, the client updates its safe list and accepts the packet.

In another embodiment, after receiving a packet, the device determines if the IP address associated with the packet is a possible one for the local network. If it is not, the packet is presumed to originate from a device which is outside the network and not part of the authentication process. Consequently, the packet may be accepted, filtered, or processed in any desired manner.

In yet another embodiment, when a device first connects to the network, it performs a proprietary DHCP (Dynamic Host Configuration Protocol) call for connection information and authentication. If authentication passes, the device is assigned to a trusted subnet by assigning it an IP address for that subnet. If authentication fails, the device is assigned to an un-trusted subnet. Devices are allowed access based on the subnet to which they are assigned.

In another embodiment, the device performs a standard DHCP call and is assigned to an un-trusted subnet by default. After the device authenticates, it is assigned to a trusted subnet.

These and other advantages of the present invention will no doubt become obvious to those of ordinary skill in the art after having read the following detailed description of the preferred embodiments which are illustrated in the various drawing figures.

BEST MODE FOR CARRYING OUT THE INVENTION

Figure 1:
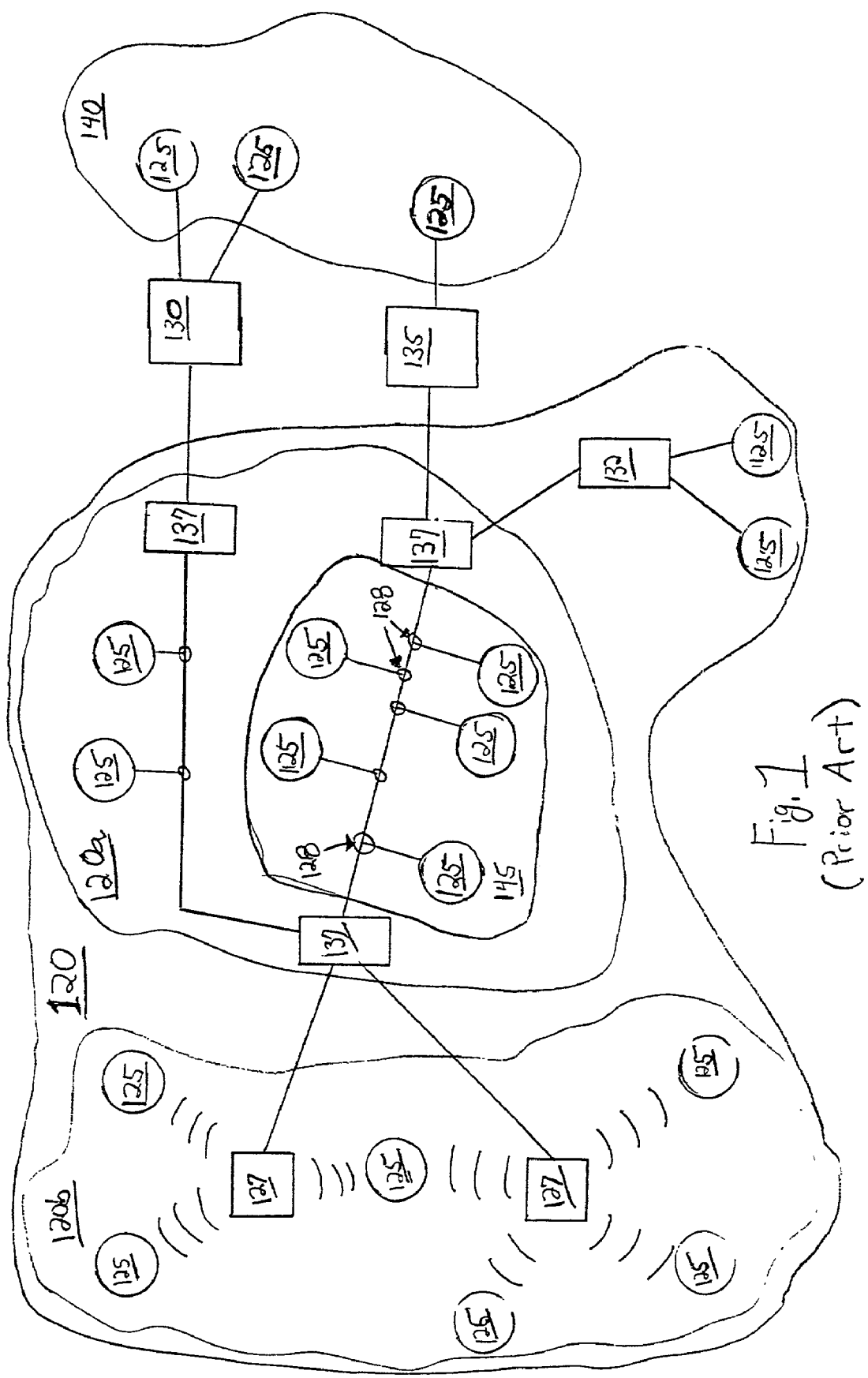
FIG. 1 is a diagram of a conventional network illustrating security problems.
Figure 2:
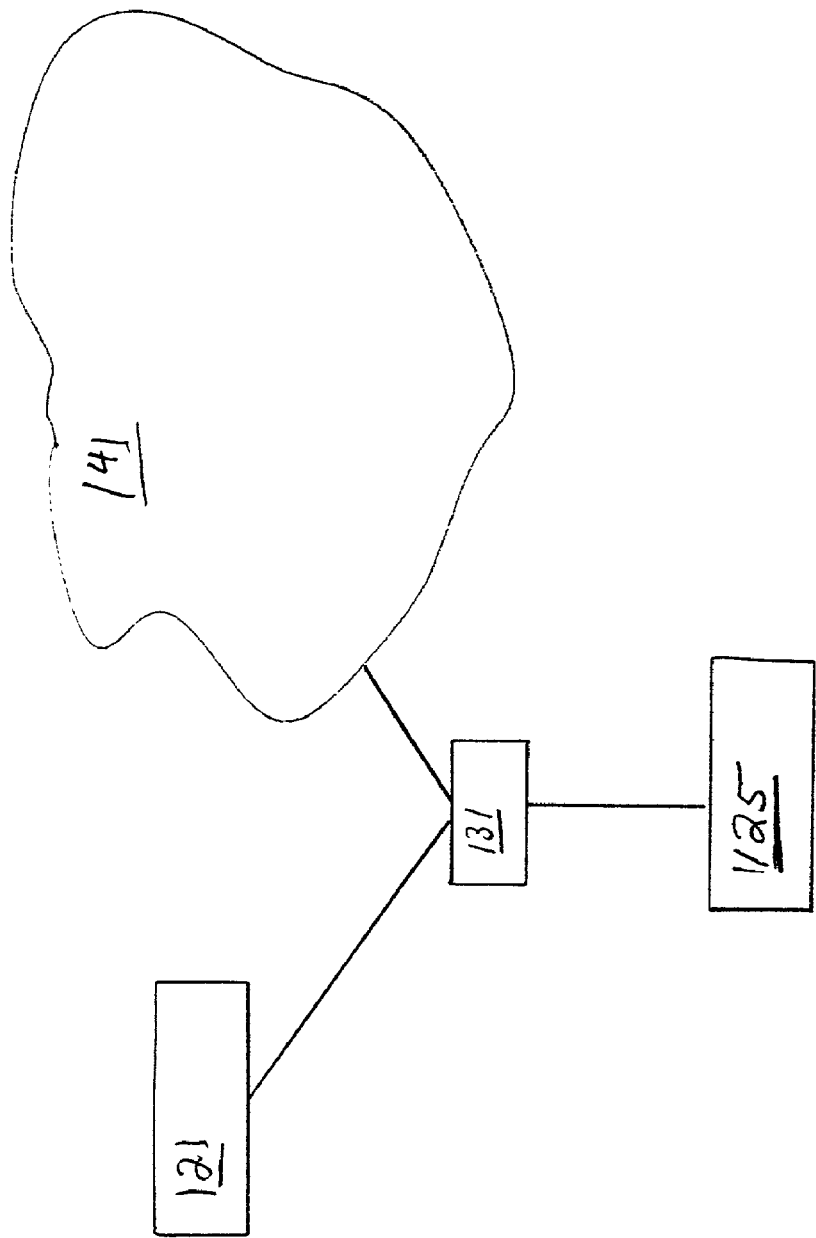
FIG. 2 is a diagram of a conventional technique to provide security for a network using a physical switch.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "measuring", "calculating", "receiving", "computing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Method for Restricting Network Access

Embodiments of the present invention provide for a method to restrict access to a network. In various embodiments, the network is a TCP/IP network; however, the present invention is not limited to TCP/IP networks. When using a TCP/IP network, non TCP/IP traffic may also be allowed on the network. In these embodiments, the protection provided for TCP/IP traffic may be complemented with other techniques for providing security for non TCP/IP traffic.

Figure 3:
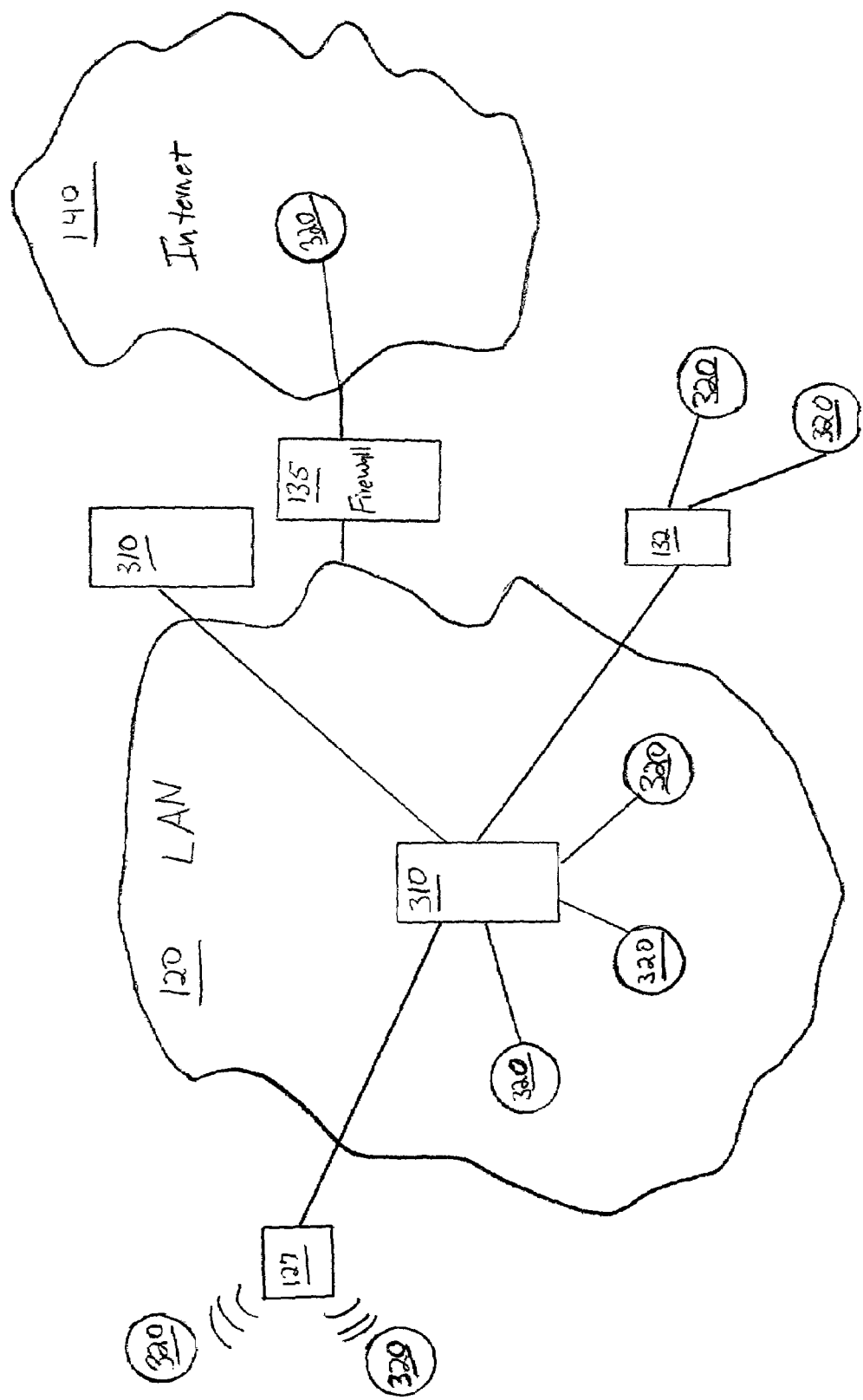
FIG. 3 is a diagram of a network that stores authorized IP addresses on a server and on client devices, according to embodiments of the present invention.

Referring to FIG. 3, embodiments provide for a method that allows devices 320 (e.g., nodes) on a network 120 (e.g., a local area network) to screen packets it receives to prevent unauthorized devices 320 from sending it packets. The nodes 320 may connect to the network 120 in a variety of ways such as, for example, a network interface connection (NIC), a PCMCIA card, a wireless LAN access point 127, a Remote Access Server (RAS) 132, a network adapter, an ASIC or other infrastructure within the device 320, etc. The authentication server 310 may keep a list of addresses for trusted (e.g., authenticated) devices 320. Each device 320 in the network 120 may also keep its own list of addresses for authenticated devices 320. The list of addresses on a device 320 may be amended after the device authenticates itself, after the device 320 receives a packet with a source address it does not recognize, when it receives a new list from the server 310, etc.

There may be multiple servers 310, some of which are not a part of the LAN 120. The LAN 120 may connect to the Internet 140 and have a firewall 135 providing protection from unauthorized devices 320 that may attempt to gain access via the Internet 140.

Figure 4:
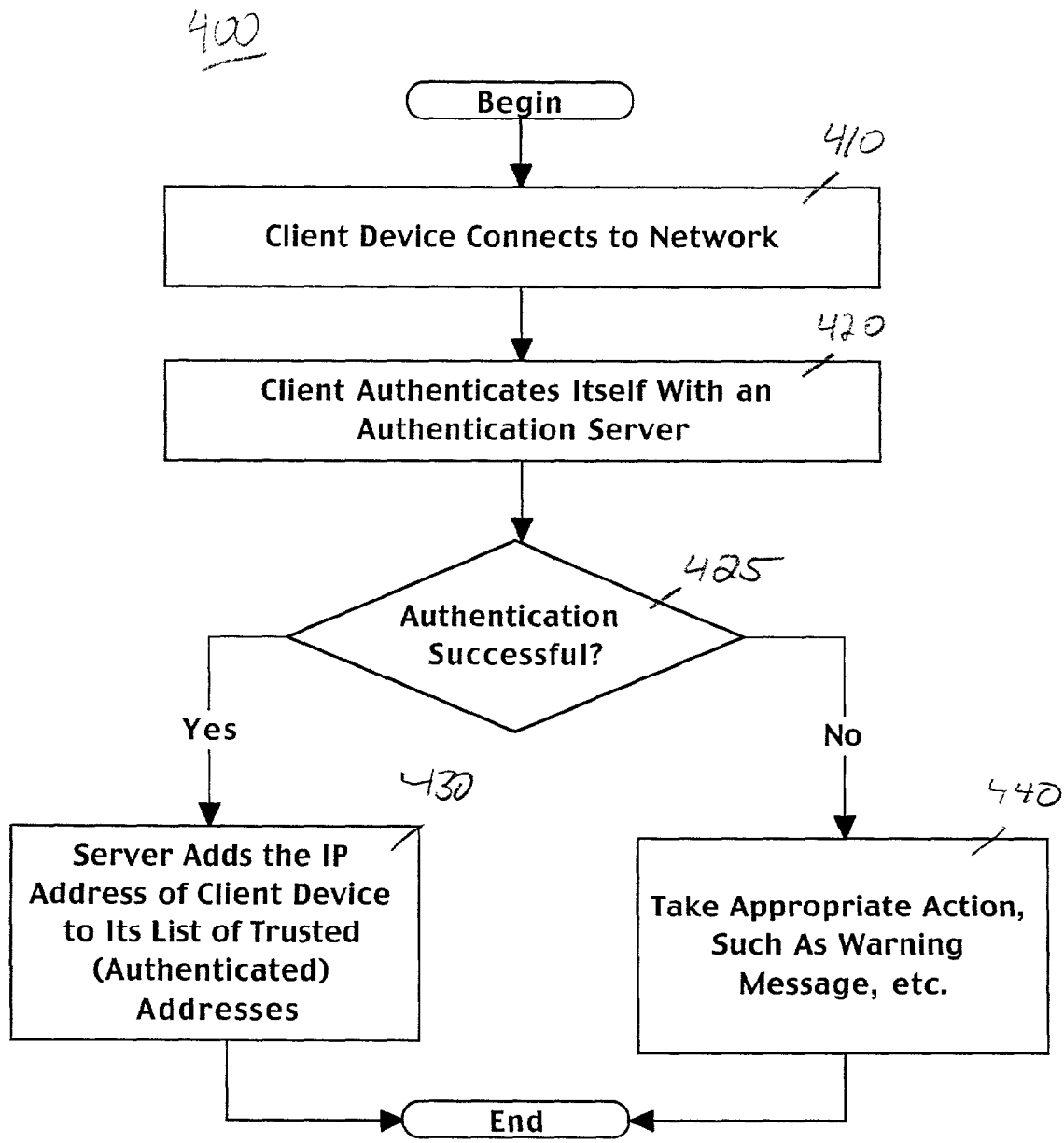
FIG. 4 is a flowchart illustrating steps of a process of adding a device to a master list of trusted devices, according to embodiments of the present invention.

Referring now to process 400 FIG. 4, an embodiment provides for adding authorized or trusted addresses (e.g., IP addresses) to a safe list on an authentication server 310. Steps of process 400 may be performed in software, which may be stored on the client device 320, the authentication server 310, or both. In step 410, a client device 320 connects to the network 120. The client device 320 may obtain its IP address by using a standard DHCP (Dynamic Host Configuration Protocol) call or it may use static IP addressing.

In step 420, the client device 320 contacts the authentication server 310 to establish that it is authorized to have access to this network 120. Any suitable authentication technique maybe used, such as, for example, the client device 320 sending the authentication server 310 a name/password pair. The authentication method allows the authentication server 310 to know that the client device 320 using the IP address belongs on the network 120 and that it is a safe or trusted device.

If the authentication is successful in step 425, then the authentication server 310 adds the IP address of the client device 320 to a list of trusted or authenticated addresses, which may be stored on the authentication server 310, in step 430. However, the present invention is not limited to using the client device's IP address to recognize the device 320.

If the authentication is unsuccessful, then in step 440 the authentication server 310 may take appropriate action, such as, for example, issuing a warning message, notifying other devices 320 in the network, sending e-mails, etc. The process 400 then ends.

Figure 5:
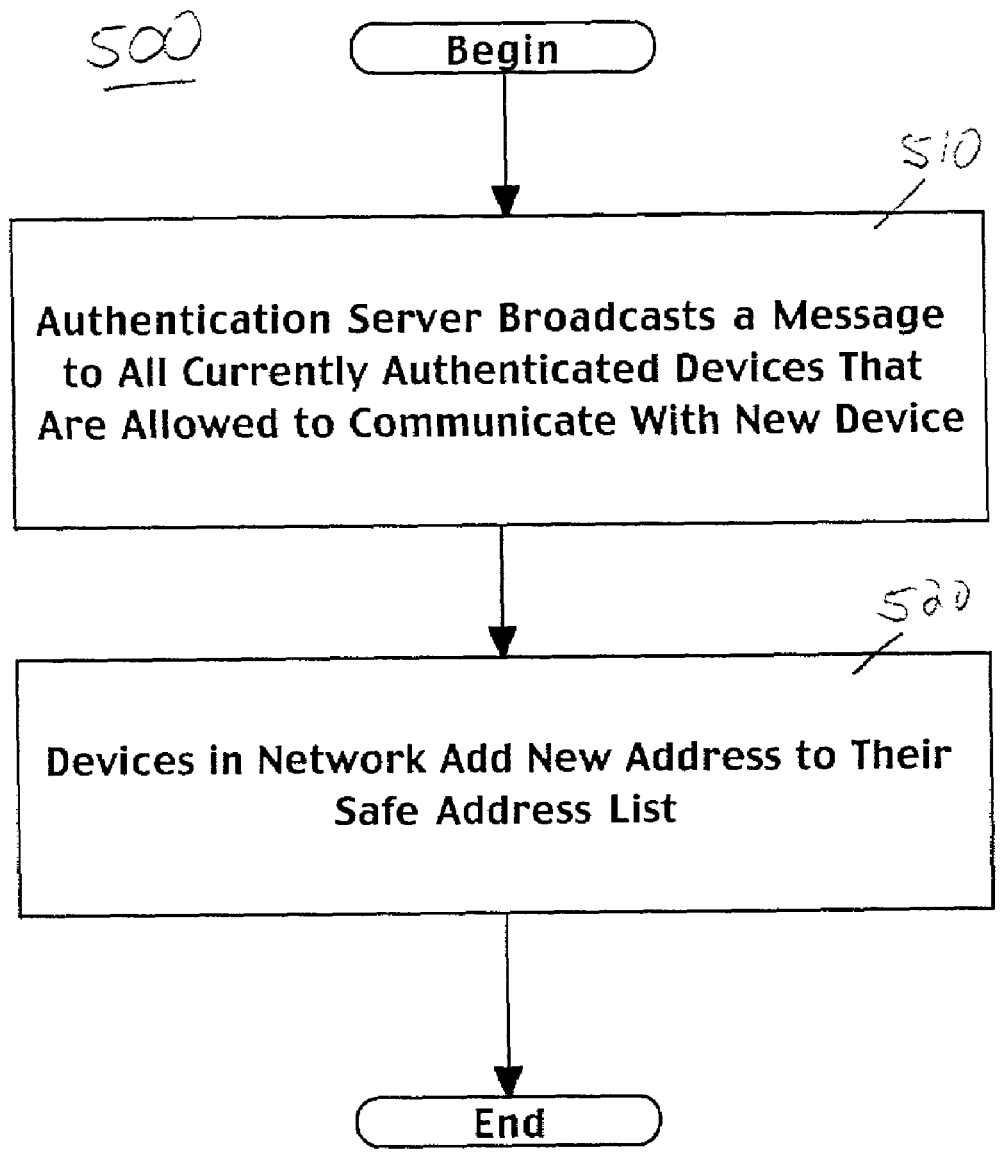
FIG. 5 is a flowchart illustrating steps of a process of transmitting a list of trusted addresses to a newly authenticate device, according to embodiments of the present invention.

After process 400 ends the authentication server 310 may take additional steps. For example, after a new device 320 has been authenticated, process 500 of FIG. 5 may be performed. Steps of process 500 may be performed in software, which may be stored on the client device 320, the authentication server 310, or both. In step 510 of process 500, the authentication server 310 broadcasts a message to all currently authenticated devices 320 to which the newly authenticated device 320 may communicate. The message provides the IP address of the newly authenticated device 320.

In step 520, the devices 320 add the IP address of the newly authenticated device 320 to their own lists of trusted or authenticated addresses, which may be stored on the individual devices 320.

Figure 6:
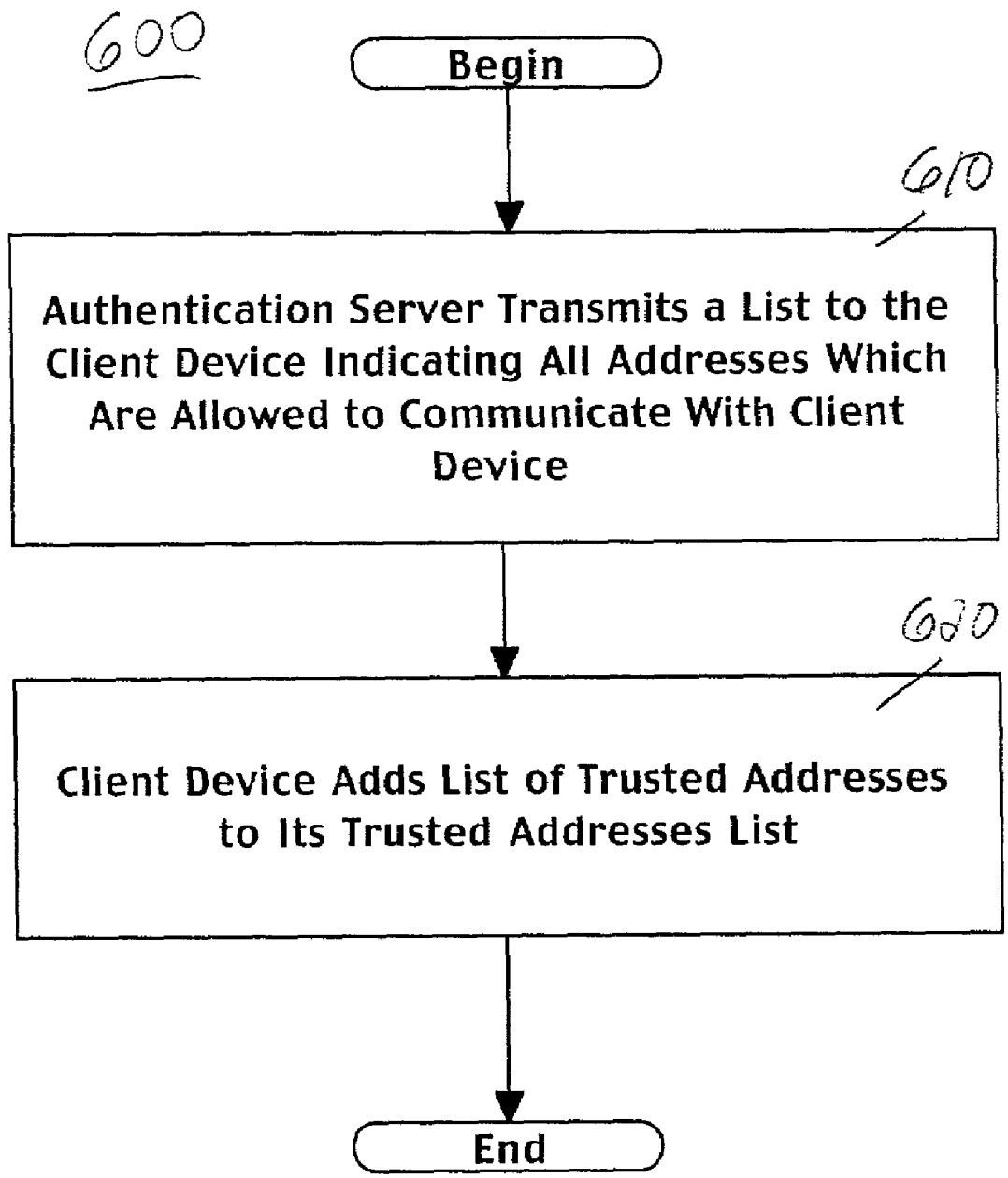
FIG. 6 is a flowchart illustrating steps of a process of devices in the network adding an address for a trusted device to a list of trusted addresses, according to embodiments of the present invention.

FIG. 6 illustrates another embodiment that may be performed after a device 320 authenticates itself as in process 400 of FIG. 4, for example. Steps of process 600 of FIG. 6 may be performed in software, which may be stored on the client device 320, the authentication server 310, or both. In step 610, the authentication server 310 transmits a list to the newly authenticated client device 320. This list contains the IP addresses of all the devices 320 from which the newly authenticated device 320 may receive packets.

In step 620, the client device 320 adds the IP addresses on this list on its own list of trusted addresses. Each client device 320 may start out with a trusted list that includes addresses for devices such as, for example, DNS server(s), authentication server(s) 310, gateway(s) the device 320 is to use, etc.

Figure 7:
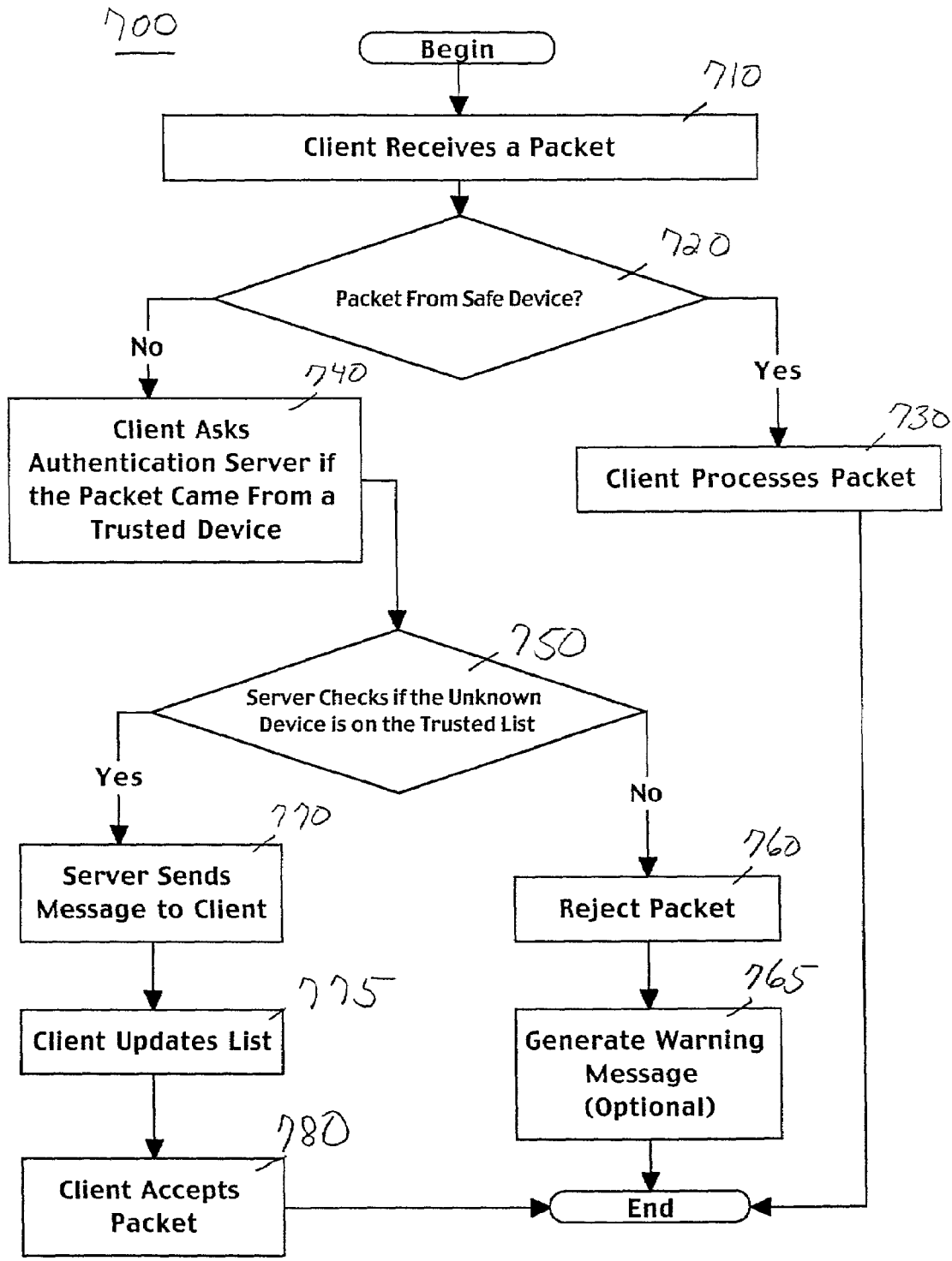
FIG. 7 is a flowchart illustrating steps of a process of a device determining if a packet came from a trusted device, according to embodiments of the present invention.

In one embodiment, each time a device 320 receives a packet, it performs a security check to determine if the packet came from a trusted device 320. Embodiments accomplish this by checking the IP address associated with the received packet against lists of trusted addresses. FIG. 7 illustrates a process 700 for performing such a method. Steps of process 700 may be performed in software, which may be stored on the client device 320, the authentication server 310, or both. In step 710, a client device 320 receives a packet.

In step 720, the client device 320 determines if the packet originated from a trusted device 320. It may do this by comparing the IP address of the source of the packet with a list of trusted IP addresses stored on the client device 320.

If the IP address is trusted, then the client device 320 processes the packet in a normal fashion, in step 730. It will be understood that a device 320 may remember, for a period of time, that it has received a packet with a given source IP address and simply accept the packet rather than perform all the steps of process 700 each time a new packet arrives.

However, if the IP address was not found on the client device's list, then the authentication server 310 is contacted to see if its list of trusted addresses contains the address in question, in step 740. In some embodiments, the client device 320 only receives updates to its own trusted address list when it contacts the server 310 after receiving a packet having an unknown source IP address. In other embodiments, the client device 320 receives updates each time a new device 320 enters the network 120. Process 700 may be used with embodiments of each type.

In step 750, the authentication server 310 scans its list of trusted addresses for the address in question. The authentication server may have multiple lists of trusted IP addresses and may scan the appropriate list for this client device 320.

If the address is not found, the authentication server 310 sends a message to the client device 320 indicating this and the client device 320 rejects the packet, in step 760.

Then, the authentication server 310 may generate a warning message, in step 765. This may be a message to all the authenticated devices 320 in the network 120, an e-mail, etc.

If the IP address in question is found on the trusted list on the authentication server 310, then the authentication server 310 sends a message indicating this to the client device 320, in step 770.

In step 775, the client device 320 updates its list of trusted addresses to incorporate the address in question. Finally, in step 780 the client device 320 accepts the packet it received in step 710. Process 700 then ends.

There may be multiple authentication servers 310, which may share information about which IP addresses have been authenticated. For example, a client device 320 may not be able to access all the authentication servers 310 or multiple servers 310 may be used to share the load. If the authentication server 310 that the client device 320 calls does not find the IP address of the packet, the authentication server 310 may check with another server 310.

Figure 8:
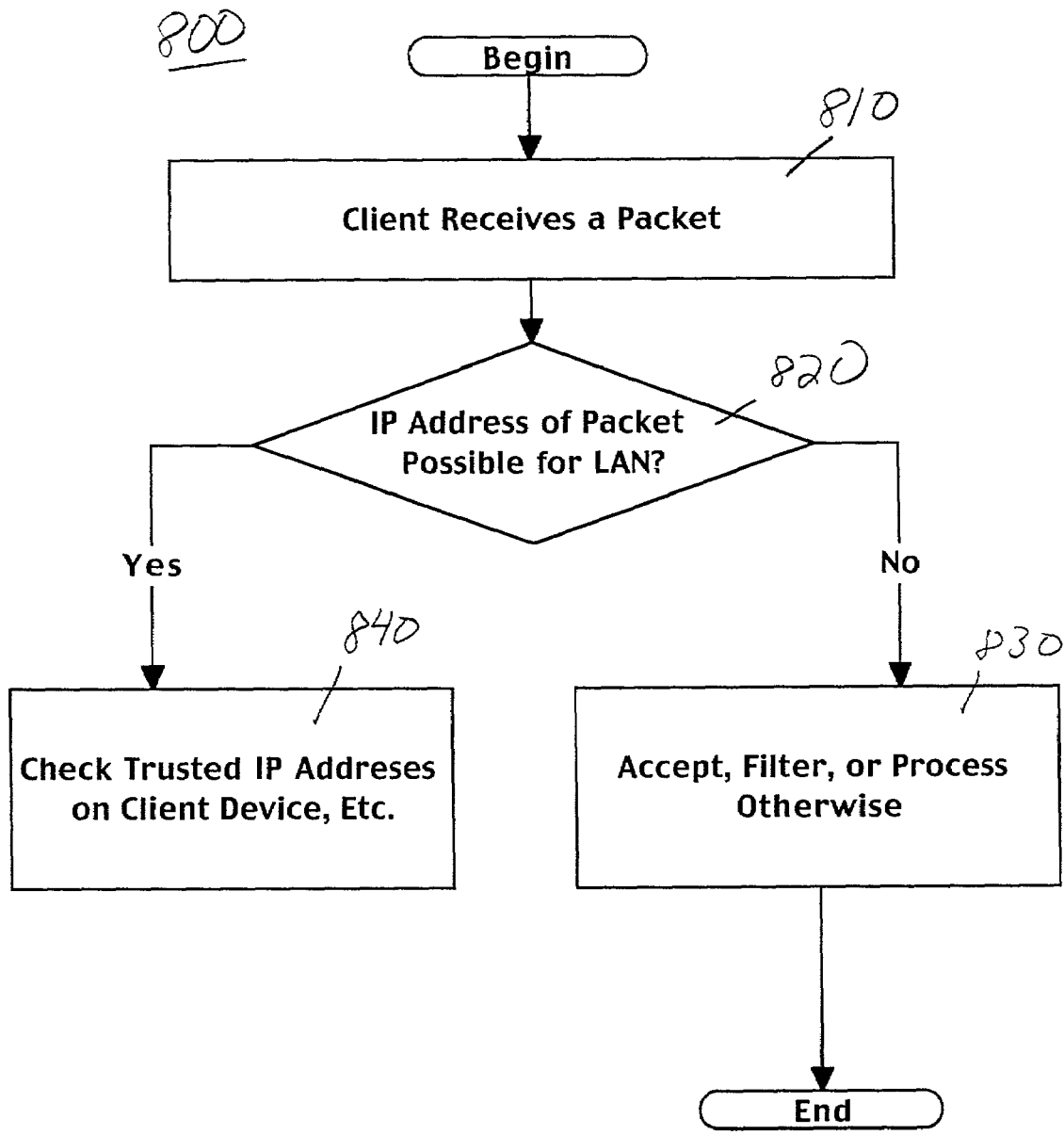
FIG. 8 is a flowchart illustrating steps of a process of a device determining if a packet came from a device outside an authentication network, according to embodiments of the present invention.

One embodiment provides for special processing of source IP addresses that cannot exist on the network 120. For example, devices that exist outside of the network 120 may not take part in the authentication process. However, it is desirable to allow such devices to communicate with devices 320 in the network 120. Referring to Process 800 of FIG. 8, such an embodiment will be discussed. Steps of process 800 may be performed in software, which may be stored on the client device 320, the authentication server 310, or both. In step 810, a client device 320 receives a packet.

In step 820, the client device 320 determines if the source IP address is possible for the network 120. For example, the network 120 may be assigned a range or set of IP addresses.

If the source IP address is outside of this range, it is assumed the packet originated from outside the network 120.

In this case, the packet is processed accordingly. For example, the packet may be accepted, it may be filtered with another process, it may be rejected, or any other suitable action may be taken, in step 830.

If the IP address is determined to be possible for the network 120, then the client device 320 proceeds to step 840 to determine if the source IP address of the packet is on its list trusted IP addresses as in steps of process 700 of FIG. 7, for example.

Figure 9:
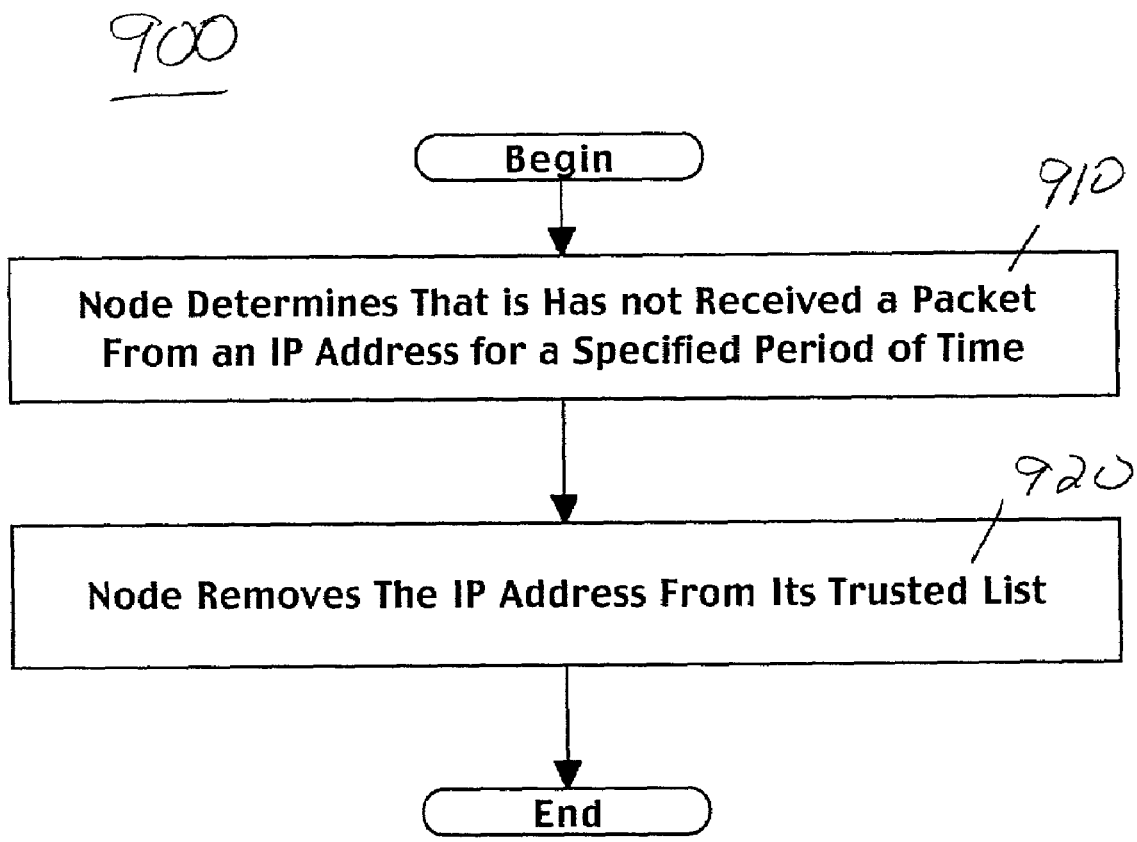
FIG. 9 is a flowchart illustrating steps of a process of a device removing an address from a list of trusted addresses, according to embodiments of the present invention.

If a device 320 has not received any packets from a device 320 for an extended period of time, the device 320 may remove that IP address from its trusted list, as illustrated in Process 900 of FIG. 9. Steps of process 900 may be performed in software, which may be stored on the client device 320, for example. In step 910, the client device (node) 320 determines that is has not received a packet for a specified period of time. Any suitable interval may be used. Furthermore, the period may depend on the device whose address is stored on the trusted list.

In step 920, the client device 320 removes the IP address from its trusted list. The client device 320 may also remove IP addresses if it runs out of memory, if it is re-booting, etc.

Figure 10:
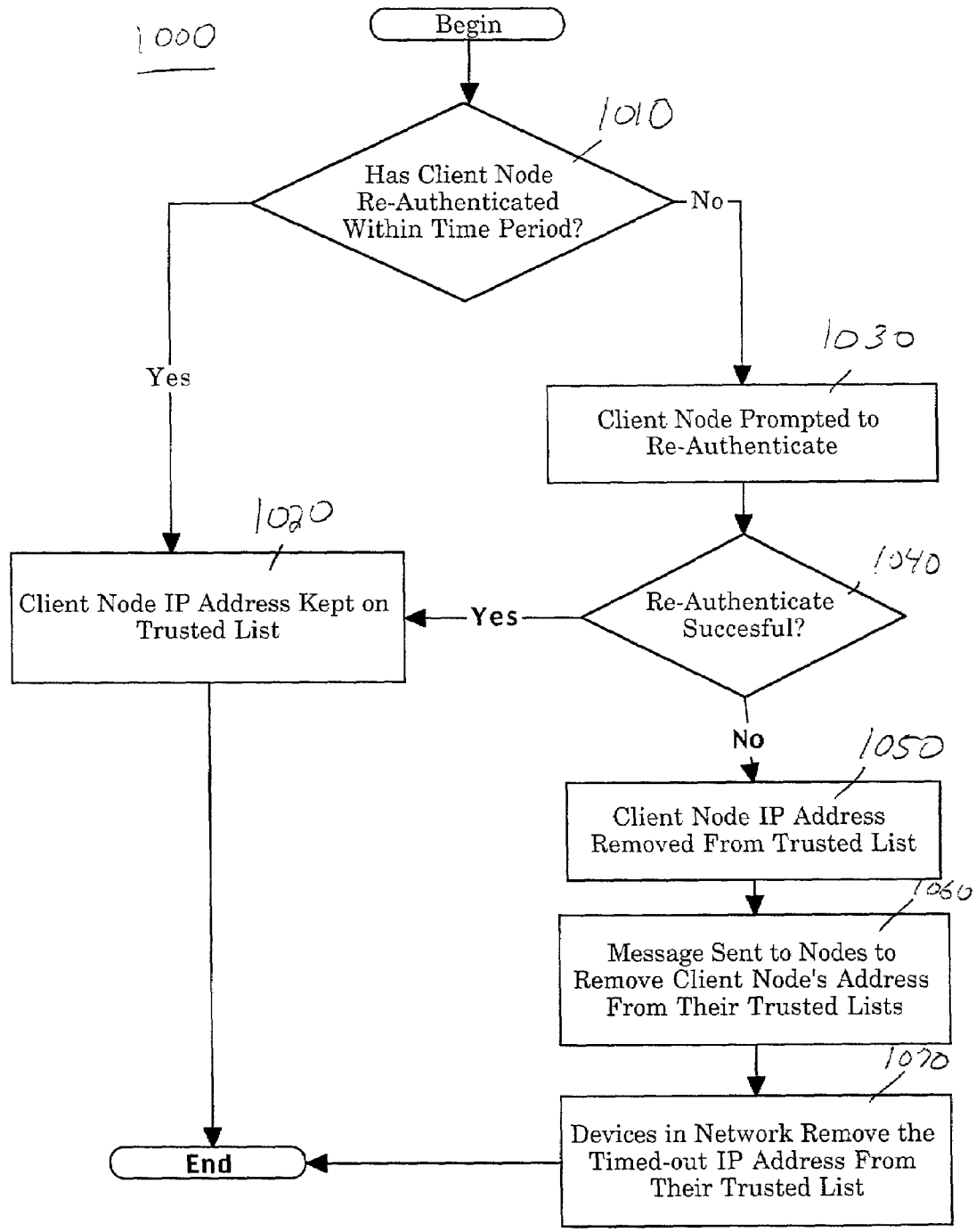
FIG. 10 is a flowchart illustrating steps of a process of re-authenticating a device, according to embodiments of the present invention.

Another embodiment provides for removing the addresses of devices 320 from trusted lists if they have failed to re-authenticate for a period of time. Referring to Process 1000 of FIG. 10, in step 1010, the authentication server 310 determines whether a client node 320 has re-authenticated with the allotted time period. Steps of process 1000 may be performed in software, which may be stored on the client device 320, the authentication server 310, or both.

If the device 320 has re-authenticated within the time limit, then the client node's IP address is kept on the authentication server's list of trusted addresses, in step 1020. If the client device 320 fails to re-authenticate, then in step 1030 the authentication server 310 may prompt the client device 320 to re-authenticate itself, although this step is optional. If step 1030 is not executed, then the Process 1000 should proceed to step 1050.

In step 1040, the server 310 determines if the client device 320 successfully re-authenticated after the prompt. If so, the client device 320 is kept on the list of trusted addresses, in step 1020. However, if it fails to re-authenticate successfully, then in step 1050 the client node's IP address is removed from the list of trusted addresses stored on the authentication server 310.

Next, the authentication server 310 sends to each client device 320 in the network 120 a message to remove the timed-out IP address from their own lists of trusted addresses, in step 1060.

Finally, in step 1070, the devices 320 perform the removal from their own lists. Process 1000 then ends. Thus, process 1000 may be beneficial in cases such as, for example, when a device 320 disconnects from the network 120. Additionally, the server 310 may periodically send a message to remove IP addresses from client device 320 trusted IP addresses even if the IP address does not time-out. This may be useful to prevent an un-authenticated device 320 from spoofing an IP address (e.g., using another device's IP address).

In one embodiment, the device 320 may use a DHCP call to get an IP address, Subnet Mask, and Gateway Address, which it will use while connected to a TCP/IP network. Thus, the device 320 does not use a static IP address or gateway in this embodiment. In this embodiment, non TCP/IP traffic is allowed on the network 120, although such traffic may not fall under the protection scheme of this embodiment. Thus, this and other embodiments may provide security enhancements when used with other protection schemes.

Figure 11:
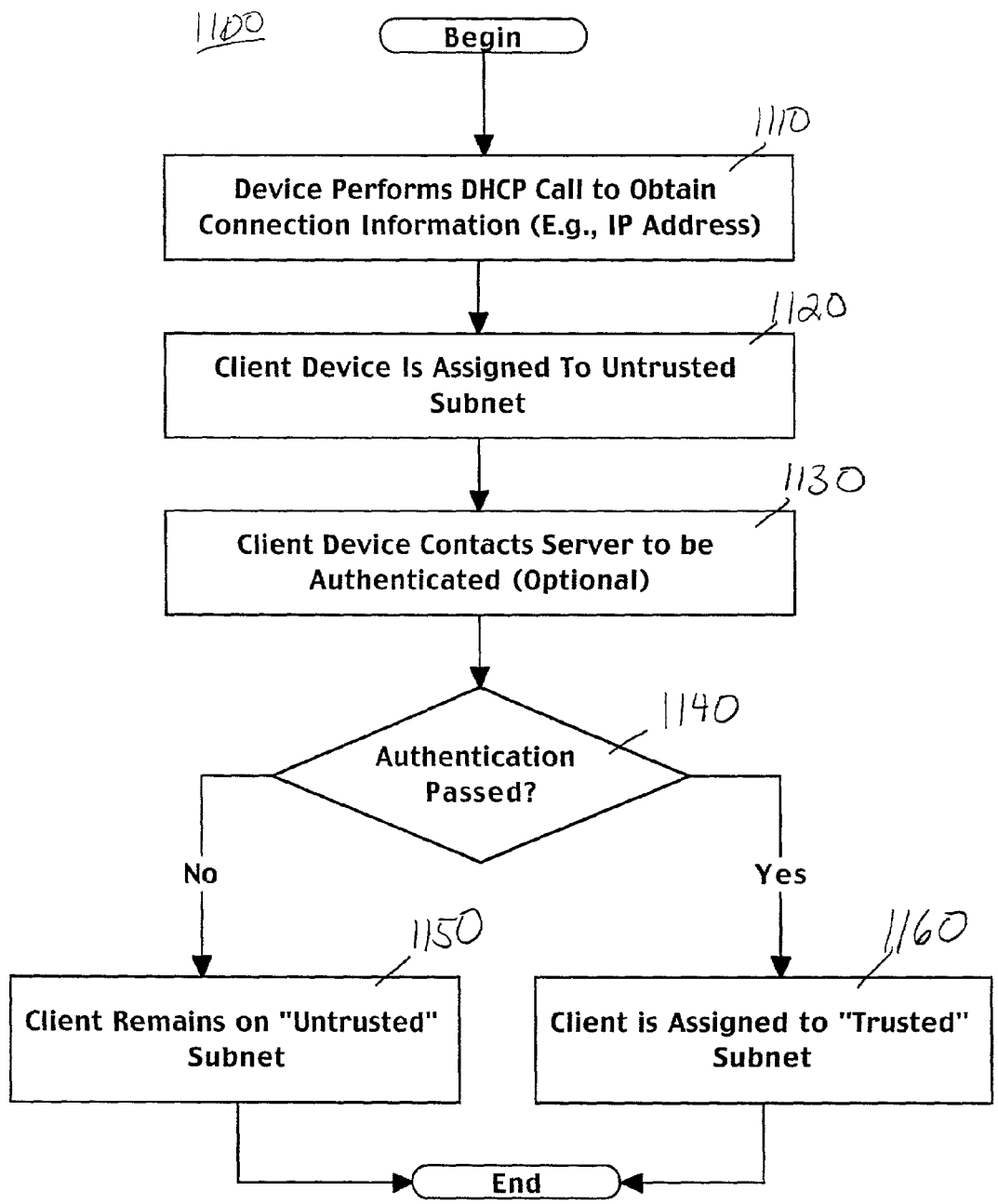
FIG. 11 is a flowchart illustrating steps of a process of assigning a device to a default subnet, according to embodiments of the present invention.

The following embodiment covers a case in which the device 320 is first connecting to the network 120, for example, device 320 is first obtaining an IP address, etc. In this embodiment, the network 120 is divided into two or more subnets. One or more subnet is an un-trusted subnet, which may be for devices 320 that have yet to authenticate themselves. Furthermore, there are one or more trusted subnets, which are for devices 320 that have authenticated themselves. Thus, multiple subnets may be used to indicate the amount of trust that should be given to a device 320. Referring now to FIG. 11, in step 1110, the client device 320 performs a DHCP call to obtain connection information, such as, for example, an IP address, subnet mask, gateway address. This may be a standard DHCP call, as is well understood by those of ordinary skill in the art. Steps of Process 1100 may be performed in software, which may be stored on the client device 320, the authentication server 310, or both.

In step 1120, the client device 320 is assigned to an un-trusted subnet, as it is yet to be authenticated. Thus, the IP address assigned to the device 320 may be used to identify the subnet to which it is assigned. When device 320 uses the IP address for the un-trusted subnet, the gateways, routers, switches, firewalls, etc. will prevent the device 320 from being able to access selected portions of the network 120. To accomplish this, a network manager may configure the network 120 appropriately, as is well understood by those of ordinary skill in the art. Thus, the device 320 may be prevented from accessing sensitive or vulnerable portions of the network 120.

In step 1130, the client device 320 contacts the authentication server 310 to be authenticated so that it may have access to a trusted subnet. The present embodiment is well suited to various authentication techniques including, but not limited to, a user-name/password pair, checking the device's media access control (MAC) address, etc.

In step 1140, the authentication server 310 determines if the authentication is successful and, if so, to which subnet the device 320 should be assigned.

If the authentication fails, then the client device 320 remains on an un-trusted subnet, in step 1150. However, other steps may be taken, as well. For example, the server 310 may issue a warning message, may prevent the device 320 from having any access to the network 120, may limit the device 310 to a second un-trusted subnet with very limited access, etc.

If the authentication passed, then the server 310 assigns the device 320 to a trusted subnet, in step 1160. For example, a device 320 may only be able to access portions of the network 120 related to finance or to portion related to engineering. Still other devices 320 may be granted access to a subnet with broad access privileges. Assigning the device 320 to a new subnet may be accomplished by performing a TCP/IP renew. As a result of this renew, the device 320 is assigned a new IP address for the trusted subnet. Process 1100 then ends.

Additional embodiments provide for variations to Process 1100 in which multiple DHCP servers are used. One or more primary DHCP servers may assign only trusted IP addresses. One or more secondary DHCP servers assign only un-trusted IP addresses. In the event that multiple DHCP servers receive the request for authentication, the client device 320 may choose to accept the IP address it desires. For example, it may receive an IP address from the server which only provides un-authenticated IP addresses and one from a server that provides authenticated IP address. It may then chose the authenticated IP address. Furthermore, if an authentication request to a DHCP server for access to a trusted subnet fails, that packet may be forwarded to a DHCP server which handles assignment to un-trusted subnets. This may be useful if the device 320 is unable to access the second DHCP server, for example.

Figure 12:
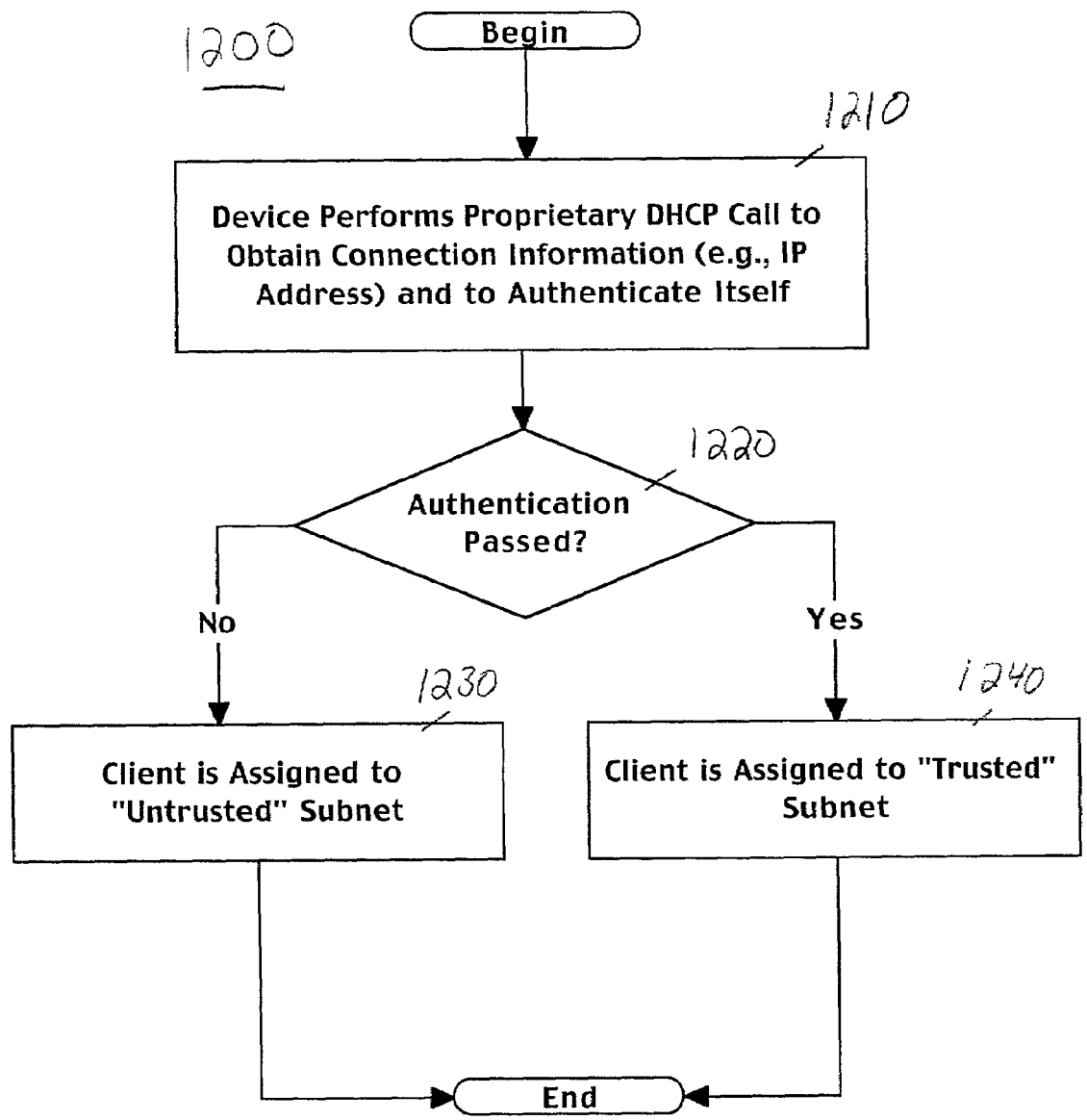
FIG. 12 is a flowchart illustrating steps of a process of assigning a device to a subnet based on its authentication, according to embodiments of the present invention.

Referring now to Process 1200 of FIG. 12, in another embodiment, the client device 320 performs a proprietary DHCP call to obtain connection information, such as, for example, an IP address, subnet mask, gateway address, etc., in step 1210. Additionally, the call is for authenticating the device 320. Thus, this embodiment may modify a conventional TCP/IP stack on device 320 to allow a proprietary DHCP call. Steps of process 1200 may be performed in software, which may be stored on the client device 320, the authentication server 310, or both.

In step 1220, the authentication server determines if authentication passed, and the device 320 is assigned to either a trusted or an un-trusted subnet in steps 1230 and 1240, similar to steps 1150 and 1160 of Process 1100 of FIG. 11.

In one embodiment, a device 320 has the option of making either a standard DHCP call or a proprietary DHCP call. Thus, in this embodiment, steps of process 1100 and process 1200 may both be used depending on the type of call a device 320 makes.

As with Process 1100, additional embodiments provide for variations to process 1200 in which multiple DHCP servers are used. A primary DHCP server may handle the proprietary DHCP call and assign only trusted IP addresses. One or more secondary DHCP servers may handle the standard DHCP calls and assign only un-trusted IP addresses. Thus, a device 320 has the option of which type of DHCP call to make. If an authentication request to a DHCP server for access to a trusted subnet fails, that packet may be forwarded to a DHCP server which handles assignment to un-trusted subnets. This may be useful if the device 320 is unable to access the second DHCP server, for example.

Figure 13:
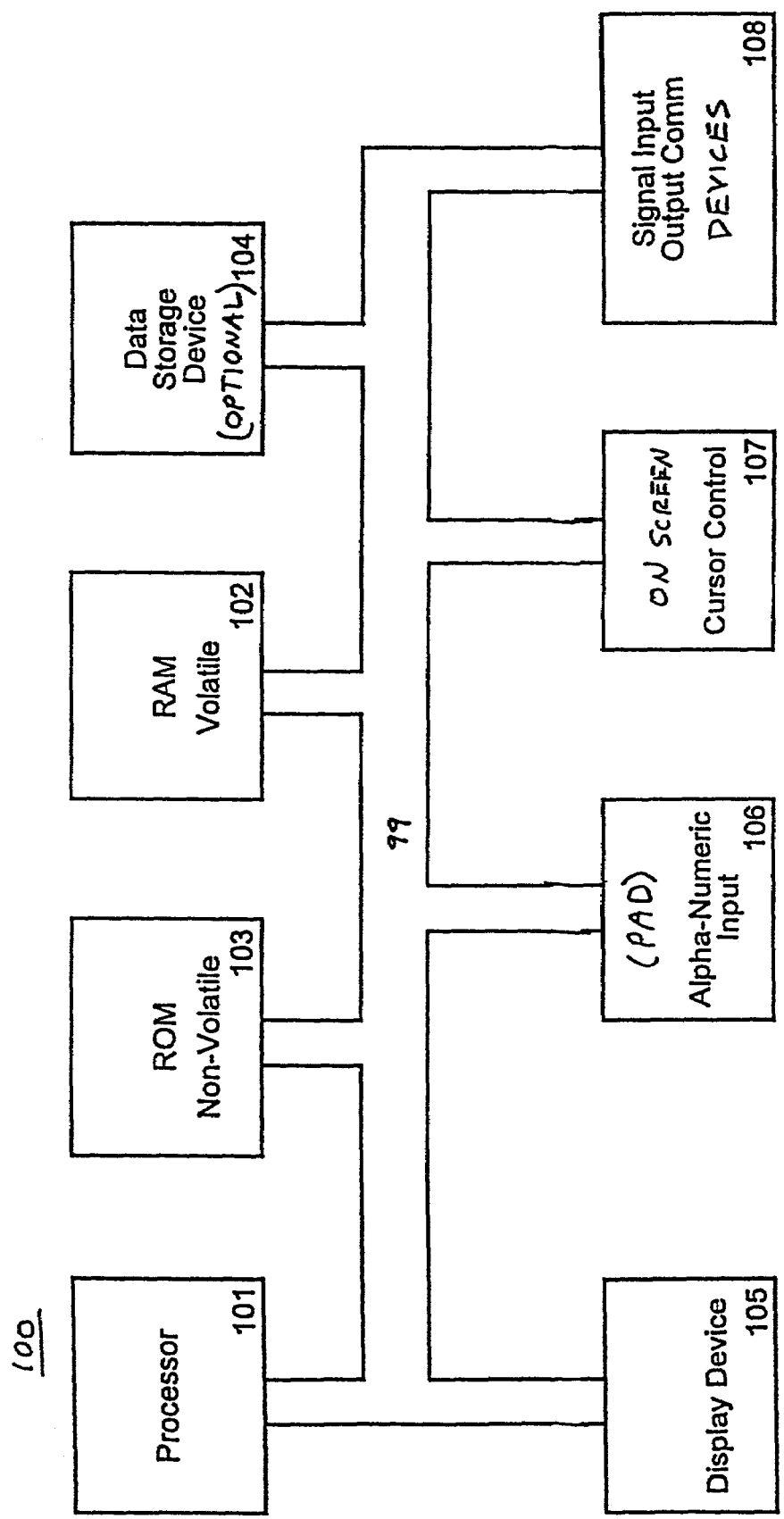
FIG. 13 is a schematic diagram of an exemplary computer system upon which the portions of the present invention may be practiced, according to embodiments of the present invention.

With reference now to FIG. 13, portions of the present method for restricting network access are comprised of computer-readable and computer-executable instructions which reside, for example, in computer-usable media of a computer system. FIG. 13 illustrates an exemplary computer system 100 used to perform the method in accordance with one embodiment of the present invention. It is appreciated that system 100 of FIG. 13 is exemplary only in that the present invention can operate within a number of different computer systems including general purpose networked computer systems, embedded computer systems, and stand alone computer systems. Additionally, computer system 100 of FIG. 13 is well adapted having computer readable media such as, for example, a floppy disk, a compact disc, and the like coupled thereto. Such computer readable media is not shown coupled to computer system 100 in FIG. 13 for purposes of clarity.

System 100 of FIG. 13 includes an address/data bus 99 for communicating information, and a central processor unit 101 coupled to bus 99 for processing information and instructions. Central processor unit 101 may be an 80x86-family microprocessor. System 100 also includes data storage features such as a computer usable volatile memory 102, e.g. random access memory (RAM), coupled to bus 99 for storing information and instructions for central processor unit 101, computer usable non-volatile memory 103, e.g. read only memory (ROM), coupled to bus 99 for storing static information and instructions for the central processor unit 101, and a data storage unit 104 (e.g., a magnetic or optical disk and disk drive) coupled to bus 99 for storing information and instructions.

With reference still to FIG. 13, system 100 of the present invention also includes an optional alphanumeric input device 106 including alphanumeric and function keys is coupled to bus 99 for communicating information and command selections to central processor unit 101. System 100 also optionally includes a cursor control device 107 coupled to bus 99 for communicating user input information and command selections to central processor unit 101. System 100 of the present embodiment also includes an optional display device 105 coupled to bus 99 for displaying information. A network interface card (NIC) 108 coupled to bus 99 is connected to a network and controls the flow of information over the network.

Therefore, it will be seen that embodiments of the present invention provide for a method to prevent unauthorized access to a network. Embodiments provide a method that does not require changes to firmware of a switch to accomplish the security. Embodiments provide a method that works in a network which is vulnerable to attack from a direct connection. Embodiments provide a method that provide security when devices such as firewalls and VPN gateways are sidestepped.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of managing a network comprising:
    a) authenticating a first node for communication in said network, said first node having a first list of trusted Internet Protocol (IP) addresses;
    b) adding an IP address of said first node to a second list of trusted IP addresses if said authentication in a) is successful, said second list stored at a second node in said network; and
    c) transmitting said second list to said first node, if said authentication in a) is successful.

2. The method of claim 1 further comprising:
    d) receiving a packet at said first node;
    e) determining if an IP address associated with said packet is in said first list of trusted IP addresses stored at said first node;
    f) determining if said IP address associated with said packet is on said second list of trusted IP addresses stored at said second node, if said IP address is not found on said first list; and
    g) sending a message to said first node indicating whether said IP address is trusted, based on the result of f).

3. The method of claim 1, further comprising:
    d) transmitting said IP address of said first node to authenticated nodes in said network, if said authentication in a) is successful.

4. The method of claim 1, further comprising:
    d) broadcasting a packet in said network indicating an IP address is un-trusted.

5. The method of claim 4, further comprising:
    e) removing said un-trusted IP address from a third list of authorized addresses at a third node in said network.

6. The method of claim 5, further comprising:
    f) removing said IP address of said first node from said second list if said first node fails to re-authenticate within a pre-determined time period.

7. The method of claim 6, further comprising:
    g) transmitting a message that said IP address of said first node is no longer trusted.

8. The method of claim 1, further comprising:
    d) removing an IP address associated with a fourth node from a third list of trusted addresses on a third node in said network if said third node fails to receive a packet from said IP address associated with said fourth node within a pre-determined time.

9. A method of managing a network comprising:
    a) authenticating a first node for communication in said network;
    b) adding an address of said first node to a first list of trusted addresses stored at a second node in said network, if said authentication is successful;
    c) transmitting said address of said first node to authenticated nodes in said network, if said authentication in a) is successful; and
    d) adding said address of said first node to a third list of trusted addresses stored at a third node in response to said transmission in c).

10. The method of claim 9, further comprising:
    e) transmitting said address of said first node to a selected group of authenticated nodes in said network, wherein said selected group comprises nodes said first node is allowed to communicate with.

11. The method of claim 9, further comprising:
    e) receiving a packet at said first node;
    f) determining if an address associated with said packet is in a second list of trusted addresses, said second list stored on said first node;
    g) determining if said address associated with said packet is on said first list of trusted addresses, if said address was not found on said second list; and
    h) sending a message to said first node indicating whether said address is on said first list of trusted addresses, based on the result or g).

12. A method of managing a network comprising:
    a) authenticating a first node to access said network;
    b) adding an address of said first node to a first list of authenticated addresses stored at a second node in said network, if said authentication is successful;
    c) transmitting a copy of said first list to said first node, if said authentication in a) is successful; and
    d) amending a second list of addresses with said first list of authenticated addresses, said second list stored on said first node.

13. The method of claim 12 wherein the second list of addresses is created by storing said first list of authenticated addresses on said first node.

14. The method of claim 12, further comprising:
    e) receiving a packet at said first node;
    f) determining if an address associated with said packet is in said second list of trusted addresses;

g) determining if said address associated with said packet is on said first list of trusted addresses, if said address associated with said packet was not found on said second list; and h) sending a message to said first node indicating whether said address associated with said packet is trusted, based on the result of g).

15. A computer readable medium having stored thereon instructions, which when run on a processor, perform a method of managing a network, said method comprising:

a) assigning a first node in said network an IP address, said assignment in response to receiving a standard Dynamic Host Configuration Protocol (DHCP) request for an address for said first node to use for communication in said network;

b) assigning said first node to a subnet in said network based on its authentication to access said network, wherein said network comprises a plurality of subnets and the subnet to which said first node is assigned is a first subnet which provides limited access to said network and controls the portions of said network to which said first node has access c) receiving a request to authenticate said first node to have access to a second subnet; and d) assigning said first node to said second subnet if said authentication is successful, wherein said second subnet provides greater access to said network that said first subnet provides.

16. The computer readable medium of claim 15, wherein a) of said method comprises receiving a proprietary Dynamic Host Configuration Protocol (DHCP) request to authenticate said first node so that said first node may have access to the first subnet of said plurality.

17. A method of managing a network, said method comprising:

a) receiving a request from a first node for an Internet Protocol (IP) address;

b) assigning said first node to a first subnet in said network, wherein said first subnet is for nodes that have not been authenticated;

c) receiving a request to authenticate said first node for access to a second subnet in said, wherein said second subnet is for nodes that have been authenticated;

d) assigning said first node to said second subnet in said network if said authentication in c) is successful; and e) keeping said first node on said first subnet if said authentication in c) is unsuccessful.

18. A computer readable medium having stored thereon computer executable instructions, which when run on a processor, perform a method of managing a network, said method comprising:

a) authenticating a first node for communication on said network, said first node having a first list of trusted Internet Protocol (IP) addresses; and b) adding an IP address of said first node to a second list of trusted IP addresses stored at a second node in said network, if said authentication in a) is successful; and c) transmitting said second list to said first node, if said authentication in a) is successful.

19. The computer readable medium of claim 18, wherein said method further comprises:

d) broadcasting said IP address of said first node, if said authentication in a) is successful.

20. The computer readable medium of claim 18, wherein said method further comprises:

d) transmitting a packet in said network indicating an IP address is un-trusted.

* * * * *